United States Patent
Yarabolu

(10) Patent No.: US 12,229,762 B2
(45) Date of Patent: Feb. 18, 2025

(54) MULTI DEVICE-MULTI CHANNEL AUTHORIZATION CODE USING HASH RECONSTRUCTION TECHNIQUE

(71) Applicant: Bank of America Corporation, Charlotte, NC (US)

(72) Inventor: Vijay Kumar Yarabolu, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 238 days.

(21) Appl. No.: 17/732,892

(22) Filed: Apr. 29, 2022

(65) Prior Publication Data
US 2023/0351378 A1 Nov. 2, 2023

(51) Int. Cl.
*G06Q 20/38* (2012.01)
*G06Q 20/10* (2012.01)
*H04L 9/32* (2006.01)
*H04L 9/40* (2022.01)
*H04W 12/08* (2021.01)
*H04W 12/33* (2021.01)

(52) U.S. Cl.
CPC ....... *G06Q 20/385* (2013.01); *G06Q 20/1085* (2013.01); *G06Q 20/3827* (2013.01); *H04L 9/3239* (2013.01); *H04L 63/0838* (2013.01); *H04W 12/08* (2013.01); *H04W 12/33* (2021.01)

(58) Field of Classification Search
None
See application file for complete search history.

(56) References Cited

U.S. PATENT DOCUMENTS

| | | | | |
|---|---|---|---|---|
| 2011/0113245 | A1* | 5/2011 | Varadarajan | G06F 21/34 |
| | | | | 713/168 |
| 2016/0012465 | A1* | 1/2016 | Sharp | G06Q 20/321 |
| | | | | 705/14.17 |
| 2017/0078278 | A1* | 3/2017 | Hong | H04W 12/068 |
| 2021/0141922 | A1* | 5/2021 | Yin | H04L 9/0643 |
| 2023/0010347 | A1* | 1/2023 | Smith | H04L 63/083 |
| 2024/0037197 | A1* | 2/2024 | Yarabolu | G06F 21/6218 |

OTHER PUBLICATIONS

"Very Basic Intro to AES-256 Cipher, Lane Wagner, Jun. 11, 2019" (Year: 2019).*
"Hashing Algorithms, JScrambler, Aug. 12, 2020" (Year: 2020).*
"Implementing Salting, Oct. 11, 2019" (Year: 2019).*
"Satya Thiumani, How to delete huge data from DynamoDB table, Apr. 30, 2020" (Year: 2020).*
"M. Syed Shahul Hammeed and Dr. N. Kannan, An Enhanced Framework of Hybrid Secure ATM Banking System for Developing Countries, 2015" (Year: 2015).*

* cited by examiner

*Primary Examiner* — Christopher Bridges
*Assistant Examiner* — Toan Duc Bui
(74) *Attorney, Agent, or Firm* — Banner & Witcoff, Ltd.

(57) ABSTRACT

Computer-implemented multi-device and multi-channel processes and machines authenticate ATM transactions by independently generating authentication hashes based on authorization arrays of varying length in which array cells have been wiped out based on a one time passcode sent by a server to a user's smart electronic device and then entered via that channel into the ATM either automatically or manually. The arrays are salted based on characteristics of the user's smart electronic device or the like. If the authentication hashes independently generated by the ATM and the server match, the ATM transaction is authorized.

13 Claims, 8 Drawing Sheets

Multi Device-Multi Channel Authorization Code –
Final AuthHash Example using Provisional and Preliminary Codes

404

| Matrix Row Index | Provisional Matrix Values | | | | | | | | |
|---|---|---|---|---|---|---|---|---|---|
| 0 | 6 | 2 | 7 | 8 | 0 | 4 | 1 | 5 | 9 | 3 |
| 1 | 3 | 9 | 5 | 6 | 0 | 4 | 1 | 2 | 8 | 7 |
| 2 | 1 | 6 | 3 | 8 | 9 | 2 | 7 | 4 | 0 | 5 |
| 3 | 7 | 5 | 9 | 3 | 6 | 1 | 4 | 0 | 8 | 2 |
| 4 | 1 | 8 | 7 | 2 | 5 | 6 | 3 | 9 | 4 | 0 |
| 5 | 9 | 8 | 5 | 0 | 2 | 3 | 7 | 1 | 6 | 4 |
| 6 | 5 | 1 | 4 | 3 | 0 | 7 | 2 | 6 | 8 | 9 |
| 7 | 0 | 7 | 1 | 5 | 2 | 4 | 3 | 9 | 6 | 8 |
| 8 | 2 | 9 | 7 | 3 | 1 | 8 | 6 | 4 | 5 | 0 |
| 9 | 9 | 0 | 8 | 4 | 5 | 7 | 1 | 3 | 2 | 6 |

402

| | | | | | | |
|---|---|---|---|---|---|---|
| Sample Matrix Row Index for 6 digit Provisional Code | 4 | 9 | 3 | 2 | 1 | 0 |
| Preliminary Code | 5 | 7 | 8 | 1 | 9 | 3 |

400 (Such as OTP)

406

| Matrix Row Index | Final AuthCode Matrix Values | | | | | | | | | Hash Value |
|---|---|---|---|---|---|---|---|---|---|---|
| 0 | 6 | 2 | 7 | 8 | 0 | 4 | 1 | 5 | 9 | | <Row0_Hash> |
| 1 | 3 | | 5 | 6 | 0 | 4 | 1 | 2 | 8 | 7 | <Row1_Hash> |
| 2 | | 6 | 3 | 8 | 9 | 2 | 7 | 4 | 0 | 5 | <Row2_Hash> |
| 3 | 7 | 5 | 9 | 3 | 6 | 1 | 4 | 0 | | 2 | <Row3_Hash> |
| 4 | 1 | 8 | 7 | 2 | | 6 | 3 | 9 | 4 | 0 | <Row4_Hash> |
| 5 | 9 | 8 | 5 | 0 | 2 | 3 | 7 | 1 | 6 | 4 | <Row5_Hash> |
| 6 | 5 | 1 | 4 | 3 | 0 | 7 | 2 | 6 | 8 | 9 | <Row6_Hash> |
| 7 | 0 | 7 | 1 | 5 | 2 | 4 | 3 | 9 | 6 | 8 | <Row7_Hash> |
| 8 | 2 | 9 | 7 | 3 | 1 | 8 | 6 | 4 | 5 | 0 | <Row8_Hash> |
| 9 | 9 | 0 | 8 | 4 | 5 | | 1 | 3 | 2 | 6 | <Row9_Hash> |
| Final Hash | | | | | | | | | | <Final_Auth_Hash> |

Fig. 4

Multi Device-Multi Channel Authorization Code
Sample Device Table

600

| | Server Stored Data for Future Validation and Hashing | |
|---|---|---|
| 602 | Device Type | Any secondary device not owner by user such as ATM Machine, POS Machine, Self Service Machine or so forth. |
| 604 | Hash Salt | Unique Hash Salt Generated by App Server for future hashing |
| 606 | DeviceCharecteristics | Native/Browser, Operating System, Hardware Charecteristics |
| 608 | Current User | Current User Logged in the device where the request originated |
| 610 | Preliminary AuthCode | Preliminary AuthCode Generated and sent to User |
| 612 | Provisional AuthCode | Provisional AuthCode Generated at NxN Length and sent to Device |

| DeviceId | DeviceType | HashSalt | DeviceCharecteristics |
|---|---|---|---|
| DI02842 | ATM Machine | <HashSalt1> | <Type_OS_Browser> |
| DI08736 | POS Machine | <HashSalt2> | <Type_OS_Browser> |
| DI00231 | SelfService Teller | <HashSalt3> | <Type_OS_Browser> |
| DI09328 | Public Terminal | <HashSalt4> | <Type_OS_Browser> |
| DI00632 | ATM Machine | <HashSalt5> | <Type_OS_Browser> |
| DI01064 | SelfService Teller | <HashSalt6> | <Type_OS_Browser> |
| DI09633 | POS Machine | <HashSalt7> | <Type_OS_Browser> |

| Current User | PreliminaryAuthCode | ProvisionalAuthCode |
|---|---|---|
| David_031 | <Prelim_AuthCode1> | <Prov_AuthCode1> |
| Marry6542 | <Prelim_AuthCode2> | <Prov_AuthCode2> |
| IamJohn123 | <Prelim_AuthCode3> | <Prov_AuthCode3> |
| Chelsia_554 | <Prelim_AuthCode4> | <Prov_AuthCode4> |
| SpiderHunter01 | <Prelim_AuthCode5> | <Prov_AuthCode5> |
| BadKarma89 | <Prelim_AuthCode6> | <Prov_AuthCode6> |
| NiceGuy12 | <Prelim_AuthCode7> | <Prov_AuthCode7> |

Note : Secondary Device is any device that is not owned by user, but used for user authentication such as ATM Machine, POS Machine and so forth.

Fig. 6B

MULTI DEVICE-MULTI CHANNEL AUTHORIZATION CODE USING HASH RECONSTRUCTION TECHNIQUE

TECHNICAL FIELD OF DISCLOSURE

The present disclosure relates to processes and machines for information security including the prevention of fraudulent and unauthorized transactions inconsistent with defined security policies to control data tampering by limiting access to authorized entities or processes for general access control or authentication of information security.

BACKGROUND

Authorization codes such as, for example, one-time passcodes ("OTP"), are often used to approve authentication of financial or high-risk transactions. These are fixed length and not strictly tied to the transaction originating device. The current identity and access management industry is heavily dependent on authorization codes. Currently, hackers and attackers almost always know the length of an authorization code before an attack is initiated, so they know how many possible attempts may need to be made on an authorization code to find out the correct one. As an example, a six (6) digit OTP will have 999999 possible combinations. A hacker could use a brute force attack to cycle through each possible combination to find the correct one. And there are no empty slots involved and OTP randomization is done and no other code is involved from client side.

Another problem is that only one physical device is involved in transaction authorization through authorization codes. Further, the authorization code transfer is in encrypted format, which can be reversed with right combination of public/private keys. All these loopholes emphasize the need to improve the authorization code generation and validation process.

SUMMARY

In accordance with one or more arrangements of the disclosures contained herein, solution(s) are provided to address one or more of the shortcomings in the identity and access management industry by, for example, generating a random length vector (e.g., provisional code at 10×10 length) as opposed to a fixed length authorization code and sending it back to a second party device (e.g., ATM, teller, POS machine, self-service terminal, public terminal, etc.) where the request originated. The usual authorization code (preliminary authorization code) can be sent to a customer's primary device. The preliminary authorization code in random rows in the provisional authorization code can be wiped out as a user enters it in a secondary device. The final authorization code can be generated by hashing an outstanding provisional code with device salt and/or characteristics of the device. The final authorization code can be carried through the secondary device and hash salt and device characteristics through the user's primary device. A server can then generate a fresh hash using salt and device characteristics, and then compare it against a received one. Additional examples and configuration variations are identified herein as well.

As a preliminary matter, in the context of this disclosure, various similar terms are used such as encryption, hashing, and salting. Although similar and often used in conjunction with one another, they serve different functions and operate differently.

For those unfamiliar with the term, "encrypting" or "encryption" refers to the practice of scrambling information in such a way that only someone who has a corresponding key can decrypt and read it. When it comes to encryption, it is a two-way street. When you encrypt something, you're doing so with the intent of decrypting it later on down the road. This is a critical distinction between encryption and hashing techniques. Data is encrypted using something known as a cipher, which consists of a series of well-defined steps that can be followed procedurally—both to encrypt and decrypt information—to encrypt and decrypt information. The algorithm is also referred to as the encryption key in some circles. A plain text document, for example, can first be encrypted into ciphertext, which can then later be decrypted to reveal the original plain text document.

With respect to a "hash" or "hashing," it is the practice of using an algorithm to map data of any size to a fixed length vector to save space on a disk. This is referred to as a hash value (or sometimes hash code or hash sums or even a hash digest). When compared to encryption, which is a two-way operation, hashing is a one-way operation. Instead of protecting data in transit, hashing is used to verify that a file or piece of data has not been altered and that it is genuine. This means that it acts as a checksum or something along those lines to provide certainty that the file or piece of data is 100% correct, uncorrupted, and unaltered.

In general, the way hashing works is that each hashing algorithm produces an output of a fixed length. An example of a well-known hashing algorithm is SHA-256. The designation "256" indicates that the algorithm will output a hash value that is 256 bits long, which is typically represented by a 64-character hexadecimal string.

Every hash value is one-of-a-kind. Consider the following scenario: a developer wants to digitally sign a piece of software and make it available for download on a website. Hashing can help the developer accomplish this. For this, the developer will create a hash of the script or executable that is being signed, and then after adding the developer's digital signature, that will be hashed as well, to ensure that everything is secure. Following that, the software is encrypted to enable secure download.

In the case of customers downloading software, their browser will decrypt the file and then look for two distinct hash values. When the browser has finished, it will run the same hash function, using the same algorithm, to hash both the file and the signature once more. If the browser generates the same hash value as the signature, it knows that both the signature and the file are authentic and have not been tampered with in any way. Alternatively, if it is not, the browser in this example would display a warning. Essentially, since there is no realistic risk that any two files can produce the same hash value, any modification—even the slightest tweak—will result in a different value. As a result of hashing, a plaintext file can be hashed with a hash function to generate a unique hashed piece of text. A skilled artisan will be readily appreciate that there are a variety of commercially known hashing algorithms available, including: MD4, MD5, SHA, RIPEMD, WHIRLPOOL, and TIGER, to name a few examples. These algorithms are not described in detail herein for the sake of brevity, but they would be readily understood by a person of ordinary skill in the art to put them into practice. Any suitable hashing function may be used in the context of this disclosure.

Last, "salt" or "salting" is a concept that is most associated with password hashing. In essence, salt is a unique value that can be appended to the end of a password to generate a different hash value. This adds an additional layer of security to the hashing process, specifically protecting against brute force attacks, which is particularly helpful. In short, a brute force attack is one in which a computer or botnet attempts every possible combination of letters and numbers until the password is discovered by the attacker. The term "salt" refers to the additional value that is added when something is salted. The idea is that by including a salt at the end of a password and then hashing it, you can make the password cracking process more difficult.

As an example, assume that the password to salt is "ThisIsMyPassword." The salt could simply be the word "SALT." Before hashing, you add SALT to the data, such as at the end of it; however, the salt could be implemented in any desired location in a vector. So, in this example of salt being appended to an existing password, it would look like this: "ThisIsMyPasswordSALT." The hash value is different than it would be for just the plain unsalted password. Even the slightest variation to the data being hashed will result in a different unique hash value.

Encryption is a two-way function (i.e., for both encryption and decryption) in which information is scrambled in such a way that it can later be decoded. For hashing, data is mapped to a fixed-length value using a one-way hashing function. Most of the time, hashing is used for authentication. And salting is an additional step during hashing that is typically associated with hashed passwords. It involves appending (or inserting a predesignated location(s) with a vector or array) an additional value to the end (or elsewhere if preferred) of the password, which alters the hash value that is produced as a result.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a multi-device multi-channel authorization process comprises the steps of: generating, at an ATM, an authorization code for an ATM transaction; transmitting, by the ATM to a server, the authorization code; authenticating, by the server, the authorization code; generating, by the server, a preliminary code; transmitting, by the server to a user's electronic device, the preliminary code; receiving, by the ATM, the preliminary code; generating, by the server, a provisional matrix; transmitting, by the server to the ATM, the provisional matrix; generating, by the ATM, a matrix row index for the preliminary code; transmitting, by the ATM to the server, the matrix row index; converting, by the ATM, the provisional matrix into an ATM final matrix by wiping entries in the provisional matrix based on the matrix row index and the preliminary code; converting, by the server, the provisional matrix into a server final matrix by wiping entries in the provisional matrix based on the matrix row index and the preliminary code; hashing, by the ATM, the ATM final matrix into an ATM hash value for each row in the ATM final matrix; hashing, by the server, the server final matrix into a server hash value for each row in the server final matrix; generating, by the ATM, an ATM final authorization hash by combining each said ATM hash value; generating, by the server, a server final authorization hash by combining each said server hash value; and authorizing, by the ATM and the server, the ATM transaction if the ATM final authorization hash matches the server final authorization hash.

In some arrangements, a multi-device multi-channel authorization process comprises the steps of: receiving, at an electronic terminal, a preliminary authorization code; generating, by the electronic terminal, a random row array; transmitting, by the electronic terminal to a user's device; the random row array; generating, by the electronic terminal, a provisional matrix; wiping out, by the electronic terminal, one or more cells in the provisional matrix; generating, by the electronic terminal, an electronic terminal final authorization hash based on one or more characteristics of said user's device and a stored hash salt; transmitting, by the electronic terminal to a server, said electronic terminal final authorization hash; receiving, by the server, the random row array; generating, by the server, a server final authorization hash based on the random row array, said one or more characteristics of said user's device, and said stored hash salt; comparing, by the server, the electronic terminal final authorization hash to the server final authorization hash; generating, by the server, an authorization an electronic transaction if the electronic terminal final authorization hash matches the server final authorization hash; and transmitting, by the server to the electronic terminal, the authorization for the electronic transaction.

In some arrangements, a multi-device multi-channel authorization process comprises the steps of: generating, by a server, a random length vector; transmitting, by the server to an ATM, the random length vector; generating, by the server, a one time passcode; transmitting, by the server to a user's electronic device, the one time passcode; receiving, by the ATM, the one time passcode; generating, by the ATM, an ATM matrix with wiped out ATM cells based on the one time passcode; generating, by the server, a server matrix with wiped out server cells based on the one time passcode; generating, by the ATM, an ATM final authorization code by hashing the random length vector with device salt and device characteristics for said user's electronic device; generating, by the server, a server final authorization code by hashing the random length vector with said device salt and said device characteristics for said user's electronic device; comparing, by the server, the ATM final authorization code and the server final authorization code; and authorizing, by the server, a transaction if the ATM final authorization code matches the server final authorization code.

In some arrangements, one or more various steps, processes, and/or functions can be implemented, in whole or in part, in conjunction with machine(s) having computer-executable instructions stored on one or more local or distributed computer-readable media potentially along with various data that are executed by one or more application integrated circuits (ASICs), processors, or the like that are communicatively coupled with various machine(s) and device(s) by any type of suitable wired and/or wireless protocol(s), network(s) (e.g., local, wide area, ultrawideband, etc.), communication busses, etc. such as generally depicted, as merely one example, in FIG. 1. A skilled artisan will readily appreciate that this disclosure is extremely broad in this regard and is not in any way limited to the example of FIG. 1.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 4 depicts a Multi Device-Multi Channel Authorization Code—Final AuthHash Example using Provisional and Preliminary Codes in accordance with one or more aspects of this disclosure.

FIGS. 6A and 6B identify exemplary server stored data for future validation and hashing as well as depict a Multi Device-Multi Channel Authorization Code Sample Device Table in accordance with one or more aspects of this disclosure.

DETAILED DESCRIPTION OF THE DISCLOSURE

Figure 1:
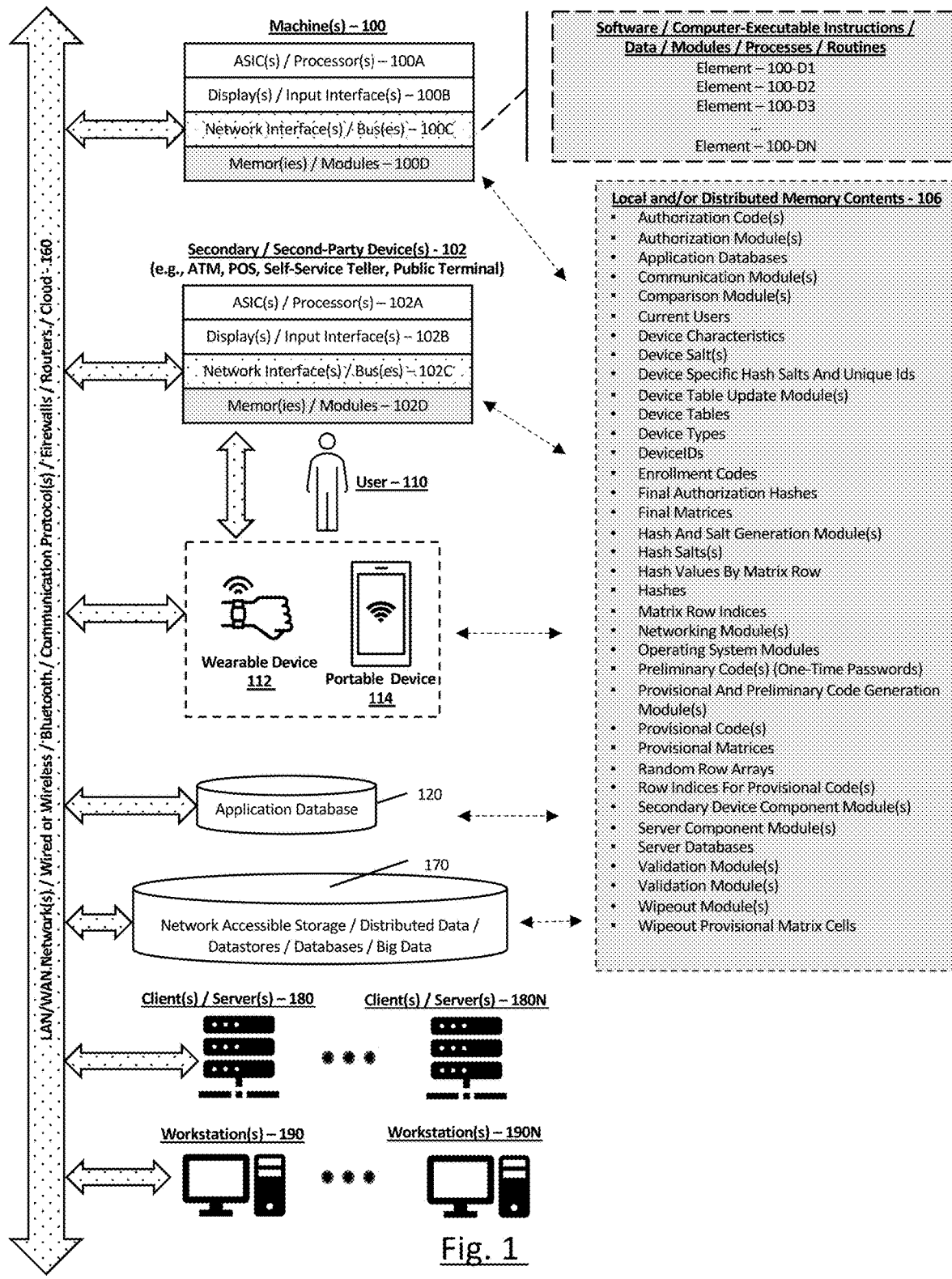
FIG. 1 depicts exemplary operating environment(s) and functionality for information security machines and processes to implement one or more aspects of this disclosure to provide improvements in the identity and access management industry.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, (including ATMs, POS, self-service teller, public terminals, etc.) or the like (e.g., 100, 102, 112, 114, 180 . . . 180N, 190 . . . 190N etc.) can include one or more general-purpose, customized, configured, special-purpose, virtual, physical, and/or network-accessible devices such as: administrative computers, clients, clusters, compliance watchers, computing devices, computing platforms, controlled computers, controlled computers, controlling computers, desktop computers, distributed systems, enterprise computers, instances, laptop devices, monitors or monitoring systems, nodes, notebook computers, personal computers, portable electronic devices, servers, smart devices, streaming servers, tablets, and/or workstations, which may have one or more ASICs, microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any particular type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc. (e.g., 100A, 102A, etc.), display(s) and/or input interfaces/devices (e.g., 100B, 102B, etc.), network interfaces, communication buses, or the like (e.g., 100C, 102C, etc.), and memories or the like (e.g., 100D, 102D, etc.), which can include various sectors, locations, structures, or other electrical elements or components (for brevity these are not separately shown for a user's 110 wearable device 112 or portable device 114). Other specific or general components, machines, or the like are not depicted in the interest of brevity and would be understood readily by a person of skill in the art. One or more sample(s) of the foregoing, some of which are expressly depicted, can be seen in FIG. 1 along with their associated components, subcomponents, related elements, sub-elements, etc.

As used throughout this disclosure, software, computer-executable instructions, data, modules, processes, routines, or the like can include one or more: active-learning, algorithms, alerts, applications, application program interfaces (APIs), artificial intelligence, attachments, big data, cryptography, cryptographic hashes, daemons, databases, datasets, drivers, data structures, emails, encryptions, file systems or distributed file systems, firmware, governance rules, graphical user interfaces, hashes, images, instructions, machine learning, middleware, modules, objects, operating systems, platforms, processes, protocols, programs, routines, scripts, tools, utilities, etc.

In the context of this disclosure, artificial intelligence deals with imparting the decisive ability and thinking ability to the cyber security machines. It is a blend of computer science, data analytics, and computer-implemented mathematics, and can include classification algorithms (e.g., Naive Bayes, Decision Tree, Random Forest, Support Vector Machines, K Nearest Neighbors, etc.), regression algorithms (e.g., Linear Regression, Lasso Regression, Logistic Regression, Multivariate Regression, Multiple Regression, etc.), clustering algorithms (e.g., K-Means Clustering, Fuzzy C-mean, Expectation-Maximisation, Hierarchical Clustering, etc.), etc. Machine learning in the context of this disclosure is closely related and may be considered in some instances to overlap with artificial intelligence wholly or partially. In the context of this disclosure, machine learning can be supervised, semi-supervised, reinforcement, and/or unsupervised learning. Sample algorithms can include bidirectional LSTM, Logistic Regression, XG Boost, Random Forest, etc. Natural language processing may also be utilized if desired.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Examples can be seen in FIG. 1 as memor(ies)/module(s) 100D, 102D along with samples of the foregoing generically represented, in one instance for illustrative purposes, as any number of components, modules or the like such as element—100-D1, element—100-D2, element—100-D3, . . . element—100-DN in one or more sectors, locations, components, etc. Some or all the foregoing may additionally and/or alternatively be stored similarly and/or in a distributed manner in application database 120 and/or network accessible storage/distributed data/datastores/databases/big data etc. 170.

Sample local and/or distributed memory (or the like) contents in accordance with the foregoing may include, as shown in sample structure 106, software, computer-executable instructions, data, modules, process, routines or the like, such as: Authorization Codes, Authorization Modules, Application Databases, Communication Module(s), Comparison Module(s), Current Users, Device Characteristics, Device Salt(s), Device Specific Hash Salts And Unique Ids, Device Table Update Module(s), Device Tables, Device Types, DeviceIDs, Enrollment Codes, Final Authorization Hashes, Final Matrices, Hash And Salt Generation Module(s), Hash Salts(s), Hash Values By Matrix Row, Hashes, Matrix Row Indices, Networking Module(s), Operating System Modules, Preliminary Code(s) (One-Time Passwords), Provisional And Preliminary Code Generation Module(s), Provisional Code(s), Provisional Matrices, Random Row Arrays, Row Indices For Provisional Code(s), Secondary Device Component Module(s), Server Component Module(s), Server Databases, Validation Module(s), Wipeout Module(s), Wipeout Provisional Matrix Cells, and other related components, data, and modules, etc.

The foregoing software, computer-executable instructions, data, modules, processes, routines, or the like, when executed—individually and/or collectively across—one or more various computers, machines, or the like (or any components therein) may cause ASICs, processor(s), core(s), executor(s), etc. to perform one or more artificial intelligence, machine learning and/or other above-referenced functions relevant to cyber security and/or may store or otherwise maintain information that may be used in one or more aspects of this disclosure.

As used throughout this disclosure, computer "networks," topologies, or the like (e.g., 160, etc.) can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), Bluetooth, ultra-wideband (UWB), various protocol(s), or any direct or indirect combinations of the same. Networks also include associated equipment and components such as access points, adapters, buses, Bluetooth adapters, ethernet adaptors (physical and wireless), firewalls, hubs, modems, routers, and/or switches UWB adapters, located inside the network, on its periphery, and/or elsewhere, and software, computer-executable instructions, data, modules, processes, routines, or the like executing on the foregoing. Network(s) may utilize any transport that supports HTTP or any other type of suitable communication, transmission, and/or other packet-based or other suitable protocol. One or more sample(s) of the foregoing, some of which are expressly depicted, can be seen in FIG. 1 along with their associated components, subcomponents, related elements, sub-elements, etc.

Accordingly, and as described briefly above, a skilled artisan will understand that FIG. 1 depicts exemplary operating environment(s) and functionality for information security machines and processes to implement one or more cyber security aspects of this disclosure.

As used herein, a hash is a function that converts one value to another. Hashing data is a common practice in computer science and is used for several different purposes. Examples include cryptography, compression, checksum generation, and data indexing. Hashing masks the original data with another value. A hash function can be used to generate a value that can only be decoded by looking up the value from a hash table. The table may be an array, database, or other data structure. A good cryptographic hash function is non-invertible, meaning it cannot be reverse engineered.

Hashes are also used to generate checksums, which are used to ensure that files are not corrupted. Typically, checksums are small values generated based on the bits in a file or block of data, such as a disk image, and used to verify that the data is correct. Checksum functions on copies of files (such as those downloaded from the Internet) should produce hashed values that are the same as those produced by the original file when the function is run. If the file does not produce the same checksum as before, this indicates that something in the file has been changed.

Lastly, hashes are used to organize and index data. Data can be mapped to individual "buckets" within a hash table using hashing values, which are stored in a database. Each bucket is identified by a unique ID, which serves as a pointer to the underlying data. This results in an index that is significantly smaller than the original data, allowing for more efficient searching and accessing of the values. All types of hashes and the like are considered to be within the spirit and scope of this disclosure.

Figure 2:
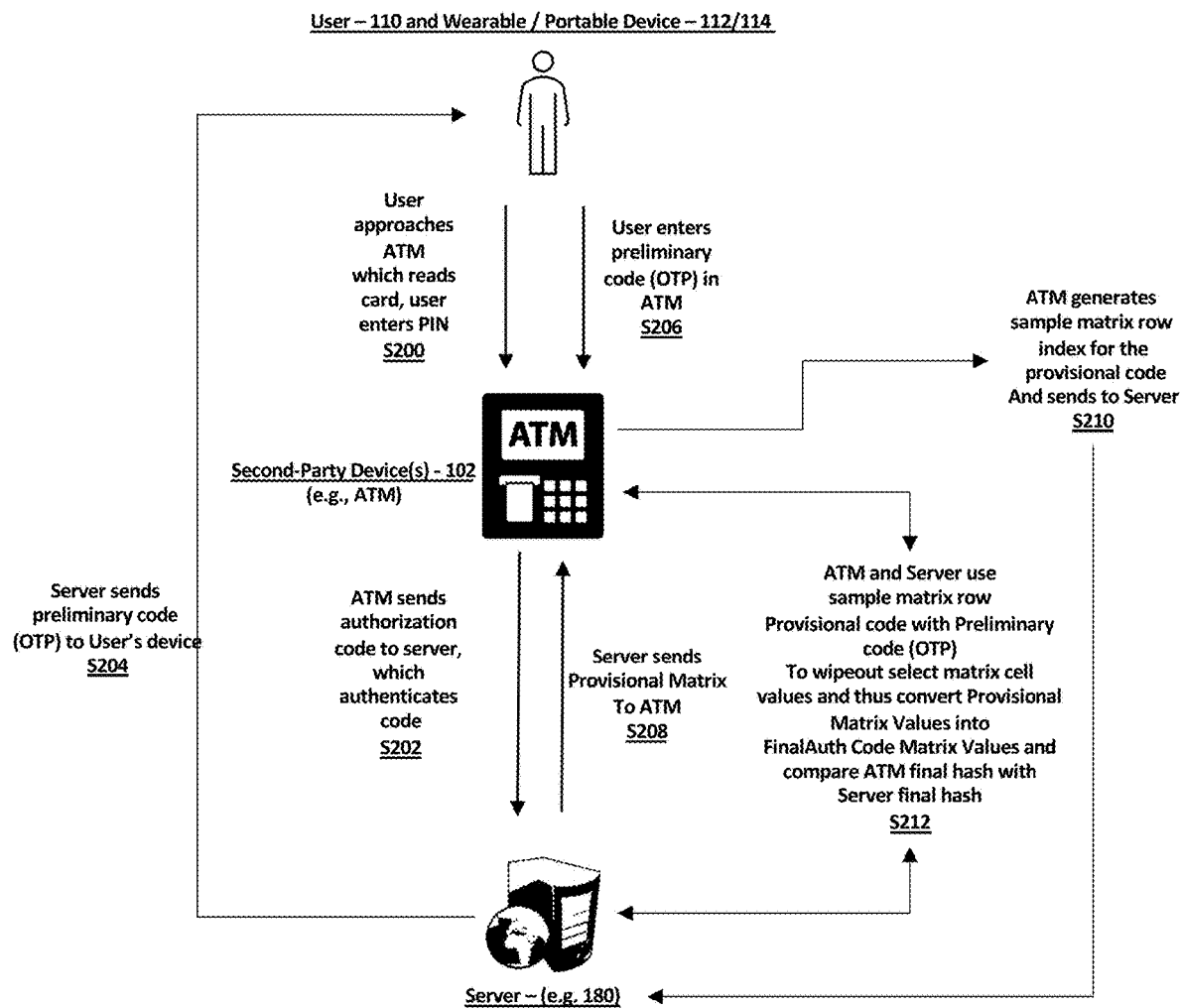
FIG. 2 is a high-level overview and flow diagram in which various aspects of this disclosure can be implemented.

FIG. 2 is a high-level overview and flow diagram in which various aspects of this disclosure can be implemented. A user 110 wearing a smart watch 112 or having some other portable smart electronic device 114 can approach a secondary device (e.g., ATM) and electronically communicate with it either wirelessly such as with a watch or physically such as by physical insertion of an ATM card into the ATM in S200. The ATM sends, to a server 180, an authorization code based on the card characteristics, information, and the PIN or other authentication information received from user in S202.

The server then sends a preliminary code (e.g., OTP) to the user's device in S204. The user can manually enter the OTP or it can be automatically relayed from the wearable or portable electronic device in S206. The server also generates and sends a provisional matrix to the ATM in S208. Example matrices are show in in FIG. 4 and will be discussed in more detail infra.

The ATM then generates a sample matrix row index for the provisional code and sends it to the server in S210. The ATM and server use the sample matrix row provisional code (OTP) to wipeout or erase select matrix cell values and thus convert provisional matrix values into FinalAuth Code Matrix Values and then compare the final ATM hash with the final server hash in S212. This is disclosed in more detail below.

Figure 3:
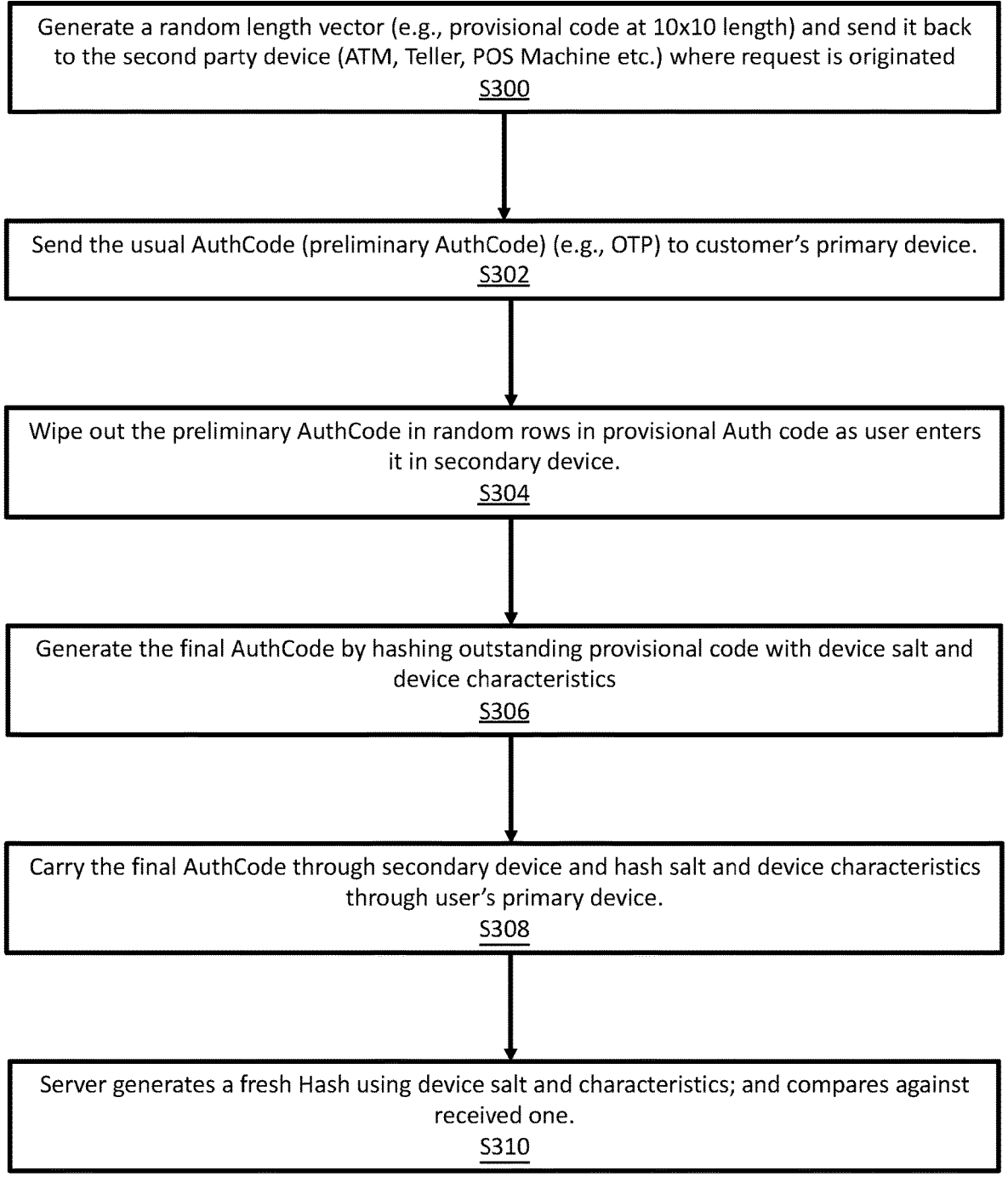
FIG. 3 sample artificial-intelligence and/or machine learning flow diagram illustrating how to implement one or more aspects of this disclosure.

By way of non-limited reference and explanation, a generic, sample, implementation of an artificial intelligence, machine-learning, and/or the like flow diagram is depicted in FIG. 3 to show how to implement one or more aspects of this disclosure. A random length vector (e.g., provisional code at 10×10 length) can be generated and send back to the second party device (ATM, Teller, POS Machine etc.) 102 or the like the where request is originated in S300. The usual Authorization code (preliminary Authorization code) can be sent to the customer's primary device in S302. The preliminary Authorization code in random rows in provisional Authorization code can be wiped out as the user enters it in the secondary device in S304. The final Authorization code can be generated by hashing the outstanding provisional code with device salt and device characteristics in S306. The final Authorization code can be carried through the secondary device and hash salt and device characteristics through user's primary device in S308. The server can generate a fresh hash using device salt and characteristics and perform a comparison against the received one in S310.

FIG. 4 depicts a Multi Device-Multi Channel Authorization code—Final AuthHash Example using Provisional and Preliminary Codes in accordance with one or more aspects of this disclosure. The preliminary code (e.g., OTP) 400 and sample matrix row index for a 6 digit or other length provisional code can be used to convert provisional matrix values 404 into Final Authorization code Matrix Values 406.

The matrices may be of any N×N dimension. For sample, purposes, the matrices are 10×10 in vector length in this example.

In this example, the first number in the sample matrix row index code is used to identify the matrix row index in the provisional matrix 404. In this example, the first digit is 4. The corresponding first number in the preliminary code (OTP) is 5.

Matrix row index 4 is identified and a search is performed to find the value of 5 within the matrix row. The value of 5 is then wiped out or erased from that row. The process repeats for each number in the sample matrix row index for the provisional code and the preliminary code (OTP). For example, in matrix row 9 the value of 7 is wiped, in row 3 the value of 8 is wiped, in row 2 the value of 1 is wiped, in row 1, the value of 9 is wiped, and lastly, in row 0 the value of 3 is wiped.

As a reminder, the numbers in the preliminary code (OTP) refers to matrix row indices. The corresponding numbers in the provisional code correspond to numbers that must be searched for and located within the individual matrix row.

As illustrated in 406, individual hash values are calculated for each matrix row. These hash values are then added together to generate the final authorization hash.

Figure 5:
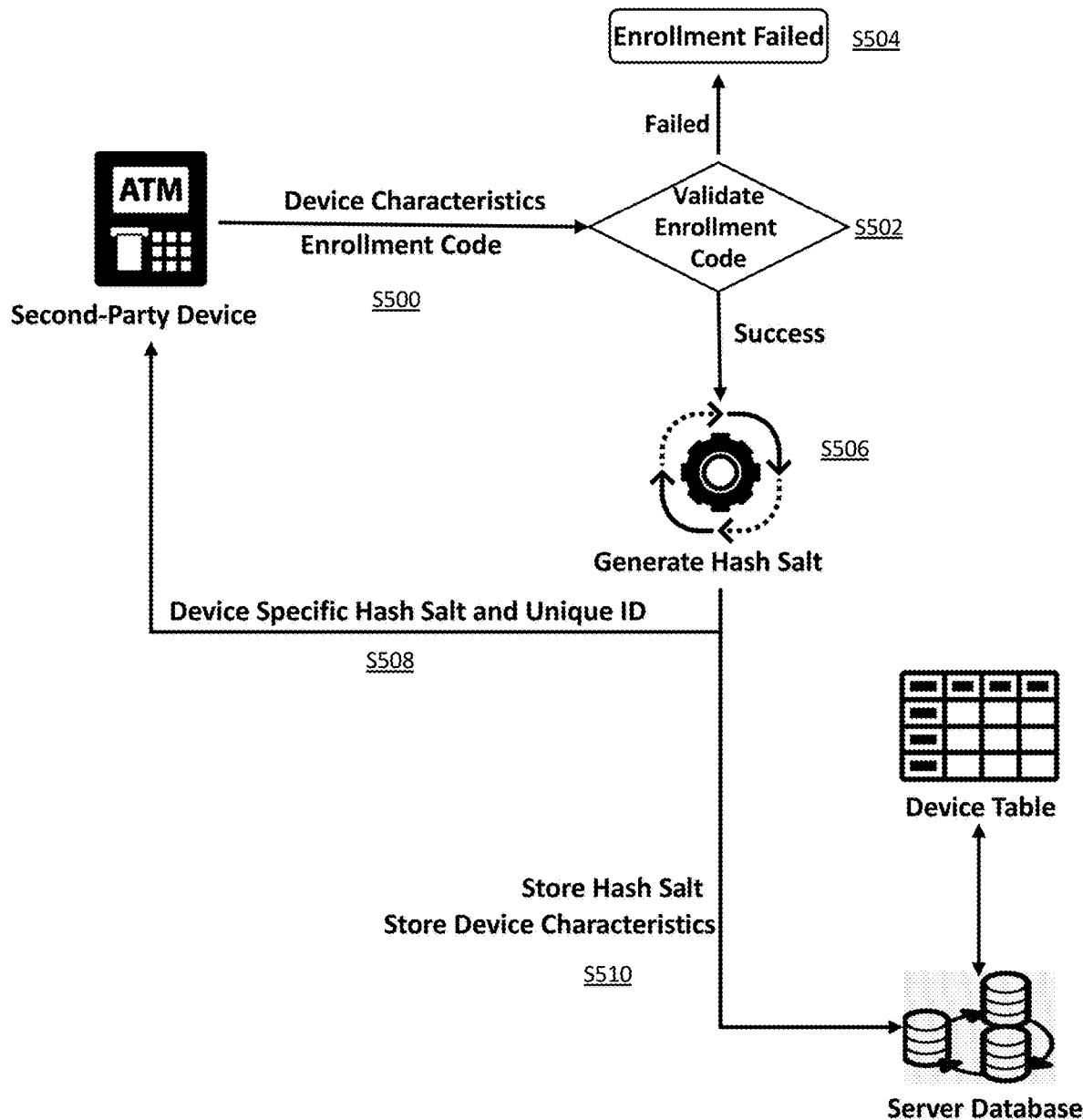
FIG. 5 depicts a Multi Device-Multi Channel Authorization Code Device Enrollment in accordance with one or more aspects of this disclosure.

FIG. 5 depicts a Multi Device-Multi Channel Authorization Code Device Enrollment in accordance with one or more aspects of this disclosure. In S500, device characteristics enrollment codes are sent to a server that then attempts to validate the codes in S502. If the enrollment fails, the transaction is terminated or canceled in S504. If successful, the server generates a hash salt in S506. The device specific hash salt and unique ID are communicated from the server to the second-party device in S508. The server also stores the hash salt and the device characteristics in a server database such as in a device tale in S510.

FIGS. 6A and 6B identify exemplary server stored data for future validation and hashing as well as depict a Multi Device-Multi Channel Authorization code Sample Device Table in accordance with one or more aspects of this disclosure. Sample server stored data for future validation and hashing is stored in FIG. 6A and is shown in context in FIG. 6B.

As illustrated in FIG. 6A, the stored data for future validation and hashing is stored on the server 180 as shown in 600. A device type 602 is stored. This may include any secondary device not owned by the user and can include secondary devices such as ATMs, POS machines, self-service machines, etc. as referenced in FIG. 1.

Also stored on the server is one or more hash salts 604, which are unique hash salt(s) generated by a server for future hashing. Any type of device characteristics 606 may also be stored such as native/browser, operating system, hardware characteristics, etc.

Current user information 608 about the user logged into the device where the transaction request is originating is also stored. Preliminary Authorization code(s) that are generated and sent to the user are stored in memory as shown in element 610. Provisional Authorization code(s) 612 that are generated as N×N length (e.g., 10×10 as in FIG. 4) are stored and also sent to secondary devices.

FIG. 6B shows a sample device table containing each device ID 614 along with the corresponding types of server stored data referenced in FIG. 6A.

Figure 7:
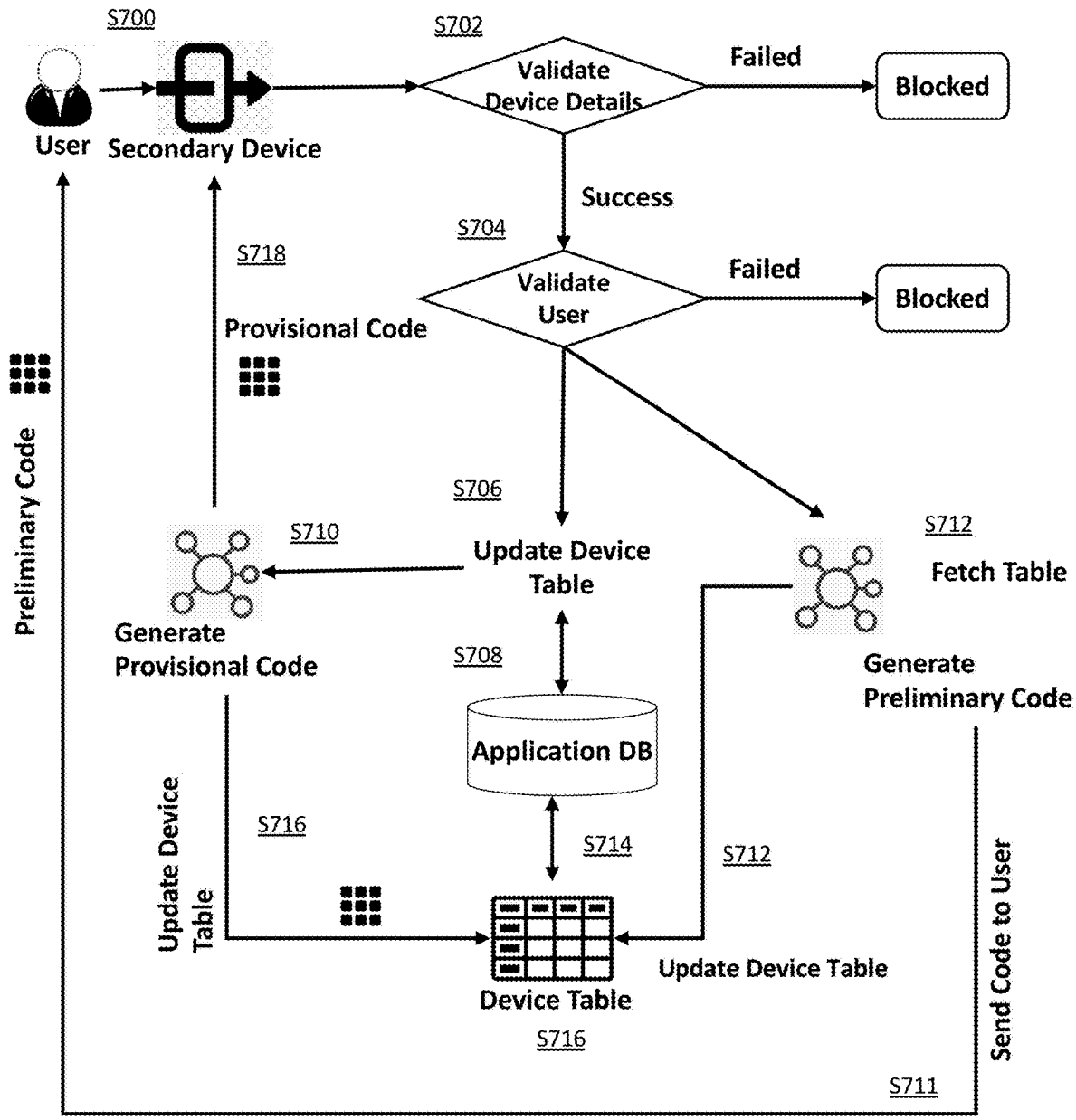
FIG. 7 shows a Multi Device-Multi Channel Authorization Code—Provisional and Preliminary Authorization Code Generation in accordance with one or more aspects of this disclosure.

FIG. 7 shows a Multi Device-Multi Channel Authorization Code—Provisional and Preliminary Authorization Code Generation in accordance with one or more aspects of this disclosure. A user initiates an interaction and proposed transaction with a secondary device such as an ATM in S700. A server then attempts to validate device details S702 and, if successful, also validate the user S704. A failure of either results in a block of the transaction as well as potential other security related activity.

The server then proceeds to update the device table in S706, which results in an update to or exchange of information with the application database in S708 and generation of a provisional code by the server in S710, which is then provided to the secondary device in S718.

After validation in S704, the server also fetches table or other information in order to generate a preliminary code S712, which is used to update the device table in S712. It is also used to provide the preliminary code to the user in S711.

The server also exchanges or transmits the requisite information between the application database and the device update table in S714, which also contains the preliminary code.

The generated provisional code is provided to the secondary device as well as the device table that is being updated in S716 and then provided to the user in S718.

Figure 8:
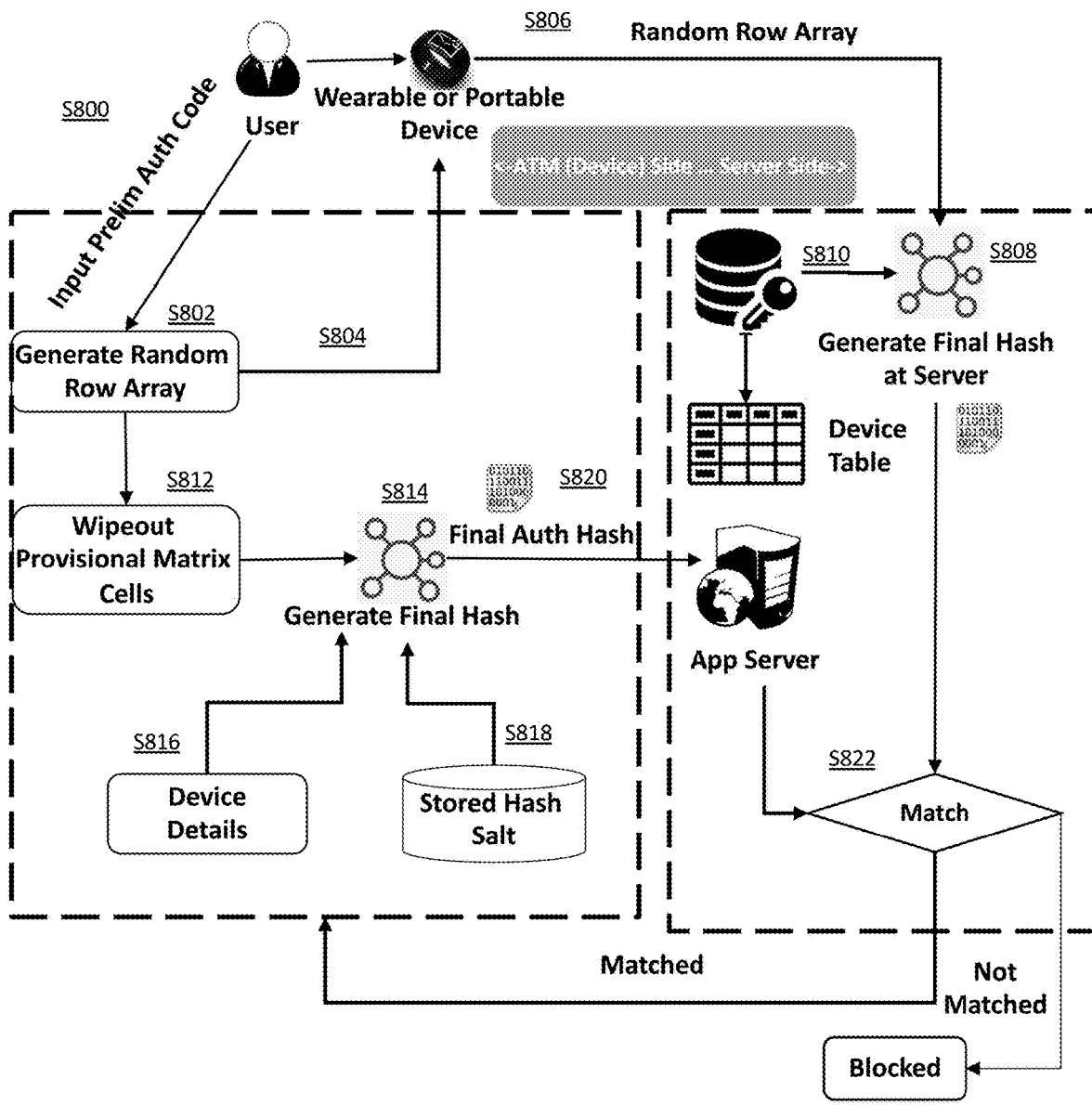
FIG. 8 shows a Multi Device-Multi Channel Authorization Code—Final Authorization code Generation and Authentication Process in accordance with one or more aspects of this disclosure.

FIG. 8 shows a Multi Device-Multi Channel Authorization Code—Final Authorization Code Generation and Authentication Process in accordance with one or more aspects of this disclosure.

In S800, the user inputs manually or automatically the preliminary authorization code (OTP) resulting in generation of a random row array in S802 on a device side machine, the array being transmitted in S804 back to the wearable or portable device.

The user's wearable or other portable device sends the random row array in S806 to a server side machine that generates in S808 a final hash based on information retrieved S810 from a database housing the device table.

After generation of the random row array in S802, the ATM device proceeds to wipeout applicable matrix cells in S812 as explained supra. The modified matrix is then provided to an ATM server, which calculates a final hash in S814 based on the device details and store hash salt respectively provided in S816 and S818. The final ATM hash is transmitted in S820 to a machine on the server side. The app server on the server side then compares the server hash with the ATM has to determine if there is a match in S822. If there is a match, the transaction is authorized; otherwise, it is blocked.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for multi-device multi-channel authorization of automated teller machine (ATM) transactions, the system comprising:
    an automated teller machine (ATM), said ATM comprising:
        a user input interface for receiving user input;
        a card reader for reading card information;
        a processor configured to execute ATM functions, said processor being coupled to:
            a memory module for storing data, wherein the memory module comprises:
                a first sector for storing an authorization code;
                a second sector for storing a preliminary code;
                a third sector for storing a matrix row index;
                a fourth sector for storing a provisional matrix;
                a fifth sector for storing an ATM final authorization hash;
            a networking module for transmitting and receiving data over a secure network connection;
        wherein the ATM functions executed by the processor include:
            the authorization module generating an authorization code for an ATM transaction based on user input and card information;
            the authorization module storing the authorization code in the first sector of the ATM memory;
            the communication module transmitting the authorization code to a server via the networking module;
            the communication module receiving a preliminary code from the server, wherein the preliminary code is a one-time password (OTP);
            the authorization module storing the preliminary code in the second sector of the ATM memory;
            the provisional and preliminary code generation module generating a matrix row index for the preliminary code, which is used to identify specific rows in a provisional matrix;
            the provisional and preliminary code generation module storing the matrix row index in the third sector of the ATM memory;
            the wipeout module converting the provisional matrix into an ATM final matrix by wiping entries in the provisional matrix based on the matrix row index and the preliminary code, wherein the wiping of entries in the provisional matrix is performed on less than all rows in the provisional matrix;
            the wipeout module storing the provisional matrix in the fourth sector of the ATM memory;
            the hash and salt generation module hashing the ATM final matrix into an ATM hash value for each row in the ATM final matrix using a cryptographic hash function;
            the hash and salt generation module generating an ATM final authorization hash by combining each said ATM hash value;
            the authorization module storing the ATM final authorization hash in the fifth sector of the ATM memory;
    a server communicatively coupled to the ATM, said server comprising:
        a processor configured to execute server functions, said processor being coupled to:
            a memory module for storing data, wherein the memory module comprises:
                a sixth sector for storing the authorization code received from the ATM;
                a seventh sector for storing a preliminary code;
                an eighth sector for storing a provisional matrix;
                a ninth sector for storing a matrix row index;
                a tenth sector for storing a server final matrix;
                an eleventh sector for storing a server final authorization hash;
            a networking module for transmitting and receiving data over a secure network connection;
        wherein the server functions executed by the processor include:
            the server component module storing the authorization code received from the ATM in the sixth sector of the server memory;
            the validation module authenticating the authorization code by comparing it with stored authorization codes;
            the provisional and preliminary code generation module generating a preliminary code, which is a one-time password (OTP);
            the server component module storing the preliminary code in the seventh sector of the server memory;
            the communication module transmitting the preliminary code to a user smartphone via a secure wireless communication channel;
            the provisional and preliminary code generation module generating a provisional matrix containing random values;
            the server component module storing the provisional matrix in the eighth sector of the server memory;
            the communication module transmitting the provisional matrix to the ATM;
            the communication module receiving the matrix row index from the ATM, which indicates specific rows to be used in a final matrix calculation;
            the server component module storing the matrix row index in the ninth sector of the server memory;
            the wipeout module converting the provisional matrix into a server final matrix by wiping entries in the provisional matrix based on the matrix row index and the preliminary code, wherein the wiping of entries in the provisional matrix is performed on less than all rows in the provisional matrix;

the server component module storing the server final matrix in the tenth sector of the server memory;

the hash and salt generation module salting the server final matrix based on device characteristics of the user smartphone that include device ID, device type, operating system, and hardware characteristics;

the server component module storing the salted server final matrix in the eleventh sector of the server memory;

the hash and salt generation module hashing the server final matrix into a server hash value for each row in the server final matrix using the cryptographic hash function;

the server component module storing each said server hash value in a twelfth sector of the server memory;

the hash and salt generation module generating a server final authorization hash by combining each said server hash value;

the server component module storing the server final authorization hash in the eleventh sector of the server memory;

the validation module authorizing the ATM transaction if the ATM final authorization hash stored in the fifth sector of the ATM memory matches the server final authorization hash stored in the eleventh sector of the server memory;

a user smartphone communicatively coupled to the ATM and the server, said user smartphone comprising:

a display for displaying information;

a wireless communication module for transmitting and receiving data;

a processor configured to execute smartphone functions, said processor being coupled to:

a memory module for storing data;

wherein the smartphone functions executed by the processor include:

the communication module receiving the preliminary code from the server via the wireless communication module;

the operating system module displaying the preliminary code on the smartphone display; and the communication module communicating the preliminary code to the ATM automatically through a near-field communication (NFC) wireless protocol via the wireless communication module.

2. The system of claim 1, wherein the secure network connection between the ATM and the server uses SSL/TLS encryption to protect the transmission of the authorization code and other sensitive data.

3. The system of claim 2, wherein the cryptographic hash function used by the ATM and the server for hashing the final matrices is SHA-256.

4. The system of claim 3, wherein the server periodically updates the stored authorization codes in the sixth sector of the server memory to enhance security.

5. The system of claim 4, wherein the provisional matrix generated by the server and stored in the ninth sector of the server memory has dimensions of 10×10.

6. The system of claim 5, wherein the device characteristics used for salting the server final matrix include an IMEI number and MAC address of the user smartphone.

7. The system of claim 6, wherein the user smartphone communicates the preliminary code to the ATM through Bluetooth in addition to said NFC.

8. The system of claim 7, wherein the server generates a new provisional matrix for each said ATM transaction to ensure unique authorization codes for every said ATM transaction.

9. The system of claim 8, wherein the ATM displays a confirmation message to the user after the ATM final authorization hash is successfully generated and stored in the fifth sector of the ATM memory.

10. The system of claim 9, wherein the server stores a log of each said ATM transaction that was authorized in a fifteenth sector of the server memory for audit and security purposes.

11. The system of claim 10, wherein the ATM is configured to erase the stored authorization code, preliminary code, matrix row index, provisional matrix, and final authorization hash from the ATM sector after each said ATM transaction is completed to prevent unauthorized access.

12. A system for multi-device, multi-channel authorization of automated teller machine (ATM) transactions, comprising:

an ATM including:
  a user input interface configured to receive user input;
  a card reader for reading card information;
  a processor configured to execute ATM functions, said processor being coupled to:
    a memory module for storing data, wherein the memory module comprises:
      a first sector for storing an authorization code;
      a second sector for storing a preliminary code;
      a third sector for storing a matrix row index;
      a fourth sector for storing a provisional matrix;
      a fifth sector for storing an ATM final authorization hash;
    a networking module for transmitting and receiving data over a secure network connection, wherein the secure network connection between the ATM and the server uses SSL/TLS encryption to protect the transmission of the authorization code and other sensitive data;
    a cryptographic hash function configured to hash the final matrices, wherein the cryptographic hash function is SHA-256;
    an authorization module configured to:
      generate an authorization code for an ATM transaction based on user input and card information;
      store the authorization code in the first sector of the memory;
      transmit the authorization code to a server via the networking module;
      receive a preliminary code from the server, wherein the preliminary code is a one-time password (OTP);
      store the preliminary code in the second sector of the memory;
      generate a matrix row index for the preliminary code, used to identify specific rows in a provisional matrix;
      store the matrix row index in the third sector of the memory;
      convert the provisional matrix into an ATM final matrix by wiping entries in the provisional matrix based on the matrix row index and the preliminary code, wherein the wiping of entries is performed on less than all rows of the provisional matrix;
store the provisional matrix in the fourth sector of the memory;
hash the ATM final matrix into an ATM hash value for each row using the cryptographic hash function;
generate an ATM final authorization hash by combining each ATM hash value;
store the ATM final authorization hash in the fifth sector of the memory;
a wipeout module for erasing the stored authorization code, preliminary code, matrix row index, provisional matrix, and final authorization hash from the ATM sectors after each transaction is completed;
a server communicatively coupled to the ATM, said server including:
a processor configured to execute server functions, said processor being coupled to:
a memory module for storing data, wherein the memory module comprises:
a sixth sector for storing the authorization code received from the ATM;
a seventh sector for storing a preliminary code;
an eighth sector for storing a provisional matrix;
a ninth sector for storing a matrix row index;
a tenth sector for storing a server final matrix;
an eleventh sector for storing a server final authorization hash;
a twelfth sector for storing individual server hash values for rows of the server final matrix;
a fifteenth sector for storing a log of each ATM transaction authorized by the server;
a networking module for transmitting and receiving data over a secure network connection;
a validation module configured to:
authenticate the authorization code by comparing it with stored authorization codes;
authorize the ATM transaction if the ATM final authorization hash matches the server final authorization hash;
a cryptographic hash function configured to hash the server final matrix into a server hash value for each row using the SHA-256 cryptographic hash function;
a salting module configured to generate a salted server final matrix based on device characteristics of the user smartphone, including IMEI number and MAC address;
a wipeout module configured to:
convert the provisional matrix into a server final matrix by wiping entries in the provisional matrix based on the matrix row index and the preliminary code, wherein the wiping of entries is performed on less than all rows of the provisional matrix;
store the server final matrix in the tenth sector of the server memory;
a log module configured to store a log of each ATM transaction authorized in the fifteenth sector of the server memory;
a provisional and preliminary code generation module configured to:
generate a preliminary code, which is a one-time password (OTP);
generate a provisional matrix containing random values;
store the matrix row index in the ninth sector of the server memory;
store the provisional matrix in the eighth sector of the server memory;
transmit the preliminary code to a user smartphone via a secure wireless communication channel;
transmit the provisional matrix to the ATM;
a user smartphone communicatively coupled to the ATM and the server, said smartphone comprising:
a display for displaying the preliminary code;
a wireless communication module for transmitting and receiving data via NFC and Bluetooth protocols;
a processor configured to:
receive the preliminary code from the server and display it on the smartphone display;
communicate the preliminary code to the ATM via the NFC protocol, or alternatively via Bluetooth.

13. A method for multi-device, multi-channel authorization of automated teller machine (ATM) transactions, comprising:
generating, by the ATM's processor, an authorization code for an ATM transaction based on user input received via a user input interface and card information read by a card reader of the ATM;
storing, by the ATM's processor, the authorization code in a first sector of the ATM memory;
transmitting, by the ATM's networking module, the authorization code to a server via a secure network connection using SSL/TLS encryption;
authenticating, by the server's validation module, the authorization code by comparing it with stored authorization codes in a sixth sector of the server memory;
generating, by the server's provisional and preliminary code generation module, a preliminary code, which is a one-time password (OTP);
transmitting, by the server's networking module, the preliminary code to a user smartphone via a secure wireless communication channel;
receiving, by the ATM's networking module, the preliminary code from the user smartphone via near-field communication (NFC) or Bluetooth;
storing, by the ATM's processor, the preliminary code in a second sector of the ATM memory;
generating, by the ATM's provisional and preliminary code generation module, a matrix row index based on the preliminary code, wherein the matrix row index identifies specific rows in a provisional matrix;
storing, by the ATM's processor, the matrix row index in a third sector of the ATM memory;
transmitting, by the ATM's networking module, the matrix row index to the server via the secure network connection;
generating, by the server's provisional and preliminary code generation module, a provisional matrix containing random values;
storing, by the server's processor, the provisional matrix in an eighth sector of the server memory;
transmitting, by the server's networking module, the provisional matrix to the ATM;
converting, by the ATM's wipeout module, the provisional matrix into an ATM final matrix by wiping specific entries in the provisional matrix based on the matrix row index and the preliminary code, wherein the wiping of entries is performed on less than all rows of the provisional matrix;

storing, by the ATM's processor, the provisional matrix in a fourth sector of the ATM memory;

converting, by the server's wipeout module, the provisional matrix into a server final matrix by wiping specific entries in the provisional matrix based on the matrix row index and the preliminary code, wherein the wiping of entries is performed on less than all rows of the provisional matrix;

storing, by the server's processor, the server final matrix in a tenth sector of the server memory;

hashing, by the ATM's hash and salt generation module, the ATM final matrix into an ATM hash value for each row using a cryptographic hash function, wherein the cryptographic hash function is SHA-256;

generating, by the ATM's hash and salt generation module, an ATM final authorization hash by combining each ATM hash value;

storing, by the ATM's processor, the ATM final authorization hash in a fifth sector of the ATM memory;

hashing, by the server's hash and salt generation module, the server final matrix into a server hash value for each row using the cryptographic hash function;

generating, by the server's hash and salt generation module, a server final authorization hash by combining each server hash value;

storing, by the server's processor, the server final authorization hash in an eleventh sector of the server memory;

salting, by the server's salting module, the server final matrix based on device characteristics of the user smartphone, including the IMEI number and MAC address;

authorizing, by the server's validation module, the ATM transaction if the ATM final authorization hash matches the server final authorization hash;

storing, by the server's log module, a log of each ATM transaction authorized by the server in a fifteenth sector of the server memory; and erasing, by the ATM's wipeout module, the stored authorization code, preliminary code, matrix row index, provisional matrix, and final authorization hash from the ATM memory sectors after each ATM transaction is completed to prevent unauthorized access.

\* \* \* \* \*